United States Patent
Archambault et al.

(10) Patent No.: US 9,847,831 B2
(45) Date of Patent: Dec. 19, 2017

(54) DUAL WAVELENTH OPTICAL TIME DOMAIN REFLECTOMETER SYSTEMS AND METHODS EMBEDDED IN A WDM SYSTEM

(71) Applicant: Ciena Corporation, Hanover, MD (US)

(72) Inventors: Jean-Luc Archambault, Ottawa (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/094,183

(22) Filed: Apr. 8, 2016

(65) Prior Publication Data
US 2017/0294959 A1 Oct. 12, 2017

(51) Int. Cl.
| H04B 10/071 | (2013.01) |
| H04B 10/077 | (2013.01) |
| H04J 14/02  | (2006.01) |
| H04Q 11/00  | (2006.01) |

(52) U.S. Cl.
CPC ....... *H04B 10/071* (2013.01); *H04B 10/0775* (2013.01); *H04J 14/0212* (2013.01); *H04Q 11/0062* (2013.01); *H04Q 2011/0083* (2013.01)

(58) Field of Classification Search
CPC combination set(s) only.
See application file for complete search history.

(56) References Cited

U.S. PATENT DOCUMENTS

| 6,519,026 | B1 | 2/2003 | Holland |
| 6,519,082 | B2 | 2/2003 | Ghera et al. |
| 6,624,927 | B1 | 9/2003 | Wong et al. |
| 7,042,559 | B1 | 5/2006 | Frigo et al. |
| 7,088,436 | B2 | 8/2006 | Saunders et al. |
| 7,336,898 | B2 | 2/2008 | Fling et al. |
| 7,388,657 | B2 | 6/2008 | Abott |
| 7,872,738 | B2 | 1/2011 | Abbott |
| 8,477,411 | B2 | 7/2013 | Griseri et al. |

(Continued)

OTHER PUBLICATIONS

Pilhan Kim, Jaehyoung Park, Hosung Yoon, Jonghan Park, and Namkyoo Park; "In Situ Design Method for Multichannel Gain of a Distributed Raman Amplifier With Multiwave OTDR"; IEEE Photonics Technology Letters, vol. 14, No. 12, Dec. 2002—(C) 2002 IEEE.

(Continued)

*Primary Examiner* — David Payne
*Assistant Examiner* — Omar S Ismail
(74) *Attorney, Agent, or Firm* — Clements Bernard Walker PLLC; Christopher L. Bernard; Lawrence A. Baratta, Jr.

(57) ABSTRACT

A dual wavelength Optical Time Domain Reflectometer (OTDR) system, embedded in a network element, includes a first OTDR source for wavelength $\lambda_1$; a second OTDR source for wavelength $\lambda_2$; an OTDR measurement subsystem adapted to measure backscatter signals $\lambda_{1\_BACK}$, $\lambda_{2\_BACK}$ associated with the wavelength $\lambda_1$ and the wavelength $\lambda_2$; and one or more ports connecting the first OTDR source, the second OTDR source, and the OTDR measurement subsystem to one or more fiber pairs; wherein wavelength $\lambda_1$ and wavelength $\lambda_2$ are each outside of one or more signal bands with traffic-bearing channels, thereby enabling operation in-service with the traffic-bearing channels.

17 Claims, 7 Drawing Sheets

(56) References Cited

U.S. PATENT DOCUMENTS

| | | |
|---|---|---|
| 8,564,876 B2 | 10/2013 | Hiraizumi et al. |
| 2002/0118442 A1 | 8/2002 | Ghera et al. |
| 2002/0159134 A1 | 10/2002 | Ghera et al. |
| 2004/0150875 A1 | 8/2004 | Fishman |
| 2005/0105167 A1 | 5/2005 | Martinielli et al. |
| 2005/0174563 A1* | 8/2005 | Evans ................. H04B 10/071 356/73.1 |
| 2006/0024063 A1 | 2/2006 | Onaka |
| 2007/0025676 A1 | 2/2007 | Russell |
| 2009/0207482 A1 | 8/2009 | Izumi |
| 2010/0119225 A1 | 5/2010 | Snawerdt |
| 2010/0128756 A1* | 5/2010 | Lee ....................... G01K 11/32 374/161 |
| 2012/0020672 A1 | 1/2012 | Aguren |
| 2013/0272694 A1 | 10/2013 | Sandstrom |
| 2014/0072306 A1* | 3/2014 | Sridhar ................ H04B 10/071 398/79 |
| 2014/0077971 A1 | 3/2014 | Archambault |
| 2015/0208146 A1* | 7/2015 | Younce .............. H04Q 11/0066 398/21 |
| 2015/0253217 A1* | 9/2015 | Gurusami .......... G01M 11/3127 356/73.1 |
| 2015/0381274 A1* | 12/2015 | Archambault ........... H04Q 9/00 398/28 |

OTHER PUBLICATIONS

D. Meshulach, O. Eyal, and R. Klein; "In-Situ time-gated method for fiber characterization and performance prediction of distributed Raman amplification"; (C) 2002—Optical Society of America.

"Optical Networks Having Optical Time Domain Reflectometers Embedded in Small Form Factor Pluggables," Lanier Ford.

\* cited by examiner

DUAL WAVELENTH OPTICAL TIME DOMAIN REFLECTOMETER SYSTEMS AND METHODS EMBEDDED IN A WDM SYSTEM

FIELD OF THE DISCLOSURE

The present disclosure generally relates to fiber optic systems and methods. More particularly, the present disclosure relates to a dual wavelength Optical Time Domain Reflectometer (OTDR) systems and methods embedded in a Wavelength Division Multiplexing (WDM) system.

BACKGROUND OF THE DISCLOSURE

Conventionally, OTDRs inject a series of optical pulses into a fiber under test and extract, from the same end of the fiber, light that is scattered (i.e., Rayleigh backscatter) or reflected back from points along the fiber. Results from OTDRs are used for estimating the fiber's length, overall attenuation, and discontinuities along the fiber. Traditionally, OTDRs are external devices relative to optical network elements (e.g., WDM systems) which operate while the fiber under test is dark (i.e., no working traffic from the optical network elements). Thus, conventional OTDRs are not designed for integration with WDM systems or to operate in-service with such WDM systems. An embedded OTDR would allow a network operator to monitor the health of fiber plant in real-time as well as provide additional advanced applications. Also, conventional OTDRs are uni-directional meaning that OTDR pulses are launched from a downstream node of the fiber under test, but not from the upstream node. This makes it difficult to detect "events" such as pinched fibers, lossy connectors or splices near the upstream node, as the OTDR trace has less resolution and becomes noisier the further an event is from the OTDR source. Another issue is that a uni-directional OTDR is in some cases unable to distinguish between a lossy splice and a change in fiber type, as both can generate a similar drop in OTDR signal. Implementing a bi-directional OTDR, where OTDR pulses are sent from both ends of a fiber span, is known to resolve both issues. However, conventional bi-directional OTDR implementations include using an OTDR test set at one site of the fiber span to acquire an OTDR trace, movement of the OTDR test set to the other end of the fiber span to acquire another OTDR trace in the same fiber but from the opposite direction. Finally, a composite trace is assembled in software to combine the two OTDR traces. Of course, such conventional implementations do not operate in real time as well as having additional complexity and coordination requirements.

BRIEF SUMMARY OF THE DISCLOSURE

In an exemplary embodiment, a dual wavelength Optical Time Domain Reflectometer (OTDR) system, embedded in a network element includes a first OTDR source for wavelength $\lambda_1$; a second OTDR source for wavelength $\lambda_2$; an OTDR measurement subsystem adapted to measure backscatter signals $\lambda_{1\_BACK}$ and $\lambda_{2\_BACK}$ associated with the wavelength $\lambda_1$ and the wavelength $\lambda_2$; and one or more ports connecting the first OTDR source, the second OTDR source, and the OTDR measurement subsystem to one or more fiber pairs; wherein wavelength $\lambda_1$ and wavelength $\lambda_2$ are each outside of one or more signal bands with traffic-bearing channels, thereby enabling operation in-service with the traffic-bearing channels. The OTDR measurement subsystem can include an optical circulator including a first port, a second port, and a third port; an optical filter connected to the first port and adapted to multiplex the first OTDR source and the second OTDR source; the second port connected to the one or more ports; and a receiver system connected to the third port. The one or more ports can include N ports and the dual wavelength OTDR system can further include a 1:N optical switch connected to the N ports, wherein the 1:N optical switch is adapted to selectively switch between the N ports to time share the dual wavelength OTDR system. The one or more ports can connect to a port on a module in the network element, with a single fiber connecting the dual wavelength OTDR to the port on the module.

The module can include a plurality of optical filters adapted to demultiplex the wavelength $\lambda_1$ and the wavelength $\lambda_2$, to add the wavelength $\lambda_1$ to a first fiber co-propagating with the traffic-bearing channels, and to add the wavelength $\lambda_2$ to a second fiber counter-propagating with the traffic-bearing channels. The wavelength $\lambda_1$ can be greater than a largest valued wavelength in the one or more signal bands and the wavelength $\lambda_2$ can be less than a smallest valued wavelength in the one or more signal bands. The wavelength $\lambda_1$ can be greater than a largest valued wavelength in the one or more signal bands to avoid non-linear interactions with the traffic-bearing channels and the wavelength $\lambda_2$ can be within a Raman gain bandwidth to monitor Raman gain. The dual wavelength OTDR system can further include a controller communicatively coupled to the OTDR measurement subsystem, wherein the controller is adapted to provide OTDR trace data to an external system. The controller can be adapted to determine a bend loss measurement, and distinguish between bend loss and a splice or connector loss to detect intrusion on a fiber. The controller can be adapted determine Raman gain based on the wavelength $\lambda_1$ being in the Raman gain regime and the wavelength $\lambda_2$ being outside the Raman gain regime.

In another exemplary embodiment, a dual wavelength Optical Time Domain Reflectometer (OTDR) method, wherein the dual wavelength OTDR is embedded in a network element, includes providing a first OTDR source for wavelength $\lambda_1$; providing a second OTDR source for wavelength $\lambda_2$; providing an OTDR measurement subsystem adapted to measure backscatter signals $\lambda_{1\_BACK}$ and $\lambda_{2\_BACK}$ associated with the wavelength $\lambda_1$ and the wavelength $\lambda_2$; and providing one or more ports connecting the first OTDR source, the second OTDR source, and the OTDR measurement subsystem to one or more fiber pairs; wherein wavelength $\lambda_1$ and wavelength $\lambda_2$ are each outside of one or more signal bands with traffic-bearing channels, thereby enabling operation in-service with the traffic-bearing channels. The OTDR measurement subsystem can include an optical circulator including a first port, a second port, and a third port; an optical filter connected to the first port and adapted to multiplex the first OTDR source and the second OTDR source; the second port connected to the one or more ports; and a receiver system connected to the third port. The one or more ports can include N ports and the method can further include providing a 1:N optical switch connected to the N ports, wherein the 1:N optical switch is adapted to selectively switch between the N ports to time share the dual wavelength OTDR system.

The one or more ports can connect to a port on a module in the network element, with a single fiber connecting the dual wavelength OTDR to the port on the module. The wavelength $\lambda_1$ can be greater than a largest valued wavelength in the one or more signal bands and the wavelength $\lambda_2$ can be less than a smallest valued wavelength in the one or more signal bands. The wavelength $\lambda_1$ can be greater than a largest valued wavelength in the one or more signal bands to avoid non-linear interactions with the traffic-bearing channels and the wavelength $\lambda_2$ can be within a Raman gain bandwidth to monitor Raman gain. The dual wavelength OTDR method can further include providing a controller communicatively coupled to the OTDR measurement subsystem, wherein the controller is adapted to provide OTDR trace data to an external system, wherein the controller is adapted to determine a bend loss measurement, and distinguish between bend loss and a splice or connector loss to detect intrusion on a fiber. The dual wavelength OTDR method can further include providing a controller communicatively coupled to the OTDR measurement subsystem, wherein the controller is adapted to provide OTDR trace data to an external system, wherein the controller is adapted to determine Raman gain based on the wavelength $\lambda_1$ being in the Raman gain regime and the wavelength $\lambda_2$ being outside the Raman gain regime.

In a further exemplary embodiment, a dual wavelength Optical Time Domain Reflectometer (OTDR) method is implemented on an optical fiber with a first wavelength OTDR subsystem communicatively coupled to one end of the optical fiber and a second wavelength OTDR subsystem communicatively coupled to another end of the optical fiber. The dual wavelength OTDR method includes performing a first OTDR measurement on the optical fiber with the first wavelength OTDR subsystem using a wavelength $\lambda_1$; and performing a second OTDR measurement on the optical fiber with the second wavelength OTDR subsystem using a wavelength $\lambda_2$, wherein the second OTDR measurement is performed with some overlap with the first OTDR measurement and without interfering therewith, wherein wavelength $\lambda_1$ and wavelength $\lambda_2$ are each outside of one or more signal bands with traffic-bearing channels, thereby enabling operation in-service with the traffic-bearing channels. The wavelength $\lambda_1$ can be greater than a largest valued wavelength in the one or more signal bands and the wavelength $\lambda_2$ can be less than a smallest valued wavelength in the one or more signal bands.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to a dual wavelength Optical Time Domain Reflectometer (OTDR) systems and methods embedded in a Wavelength Division Multiplexing (WDM) system. Note, while reference is made to WDM systems, the systems and methods can operate with any type of fiber optic communication systems, such as Dense WDM or the like as well. Variously, the systems and methods include an OTDR measurement system which can be integrated into a WDM system, such as an optical amplifier, optical transceiver, or any other module. The OTDR measurement system is integrated into components of the WDM system at both ends of a fiber span, operating on a fiber under test and providing real-time bi-directional OTDR capability. Thus, the OTDR measurement system can provide simultaneously and independent OTDR monitoring embedded in the WDM system. The OTDR measurement system includes a dual-wavelength design, capable of in-service operation with a plurality of WDM signals. For example, for a co-propagating OTDR wavelength with the WDM signals can be above the WDM signal band with a counter-propagating OTDR wavelength from the WDM signals below the WDM signal band. The two OTDR wavelengths in the OTDR measurement system are multiplexed together, enabling various optical components to be shared. In an exemplary embodiment, the OTDR measurement system can be used for intrusion detection. In another exemplary embodiment, an optical switch can be used to time-share the OTDR measurement system between multiple modules and fibers.

Figure 1:
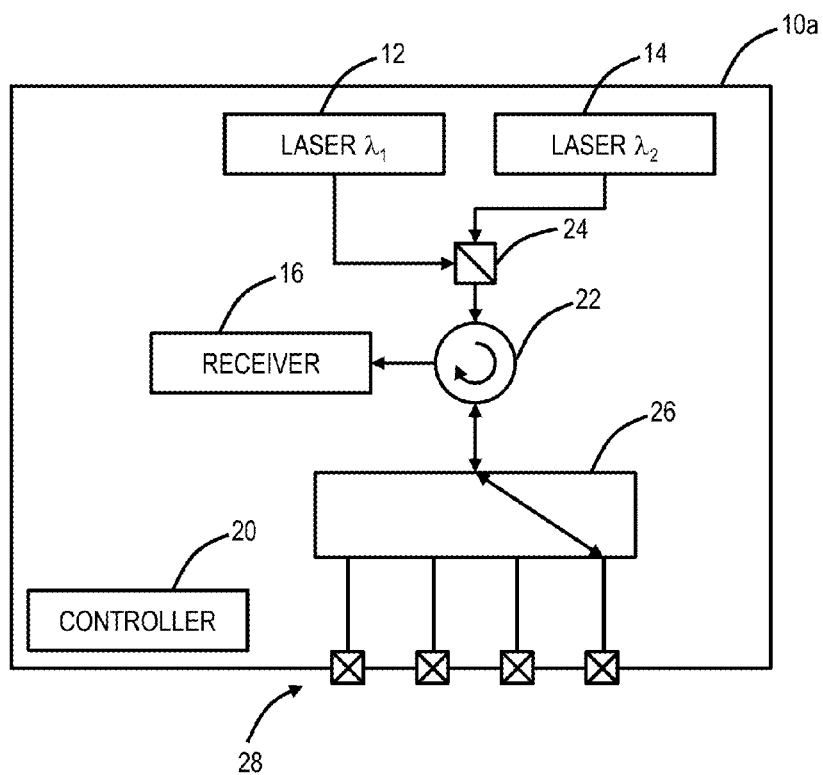
FIG. 1 is a block diagram of an OTDR measurement system with a shared receiver implementation for the dual wavelengths.
Figure 2:
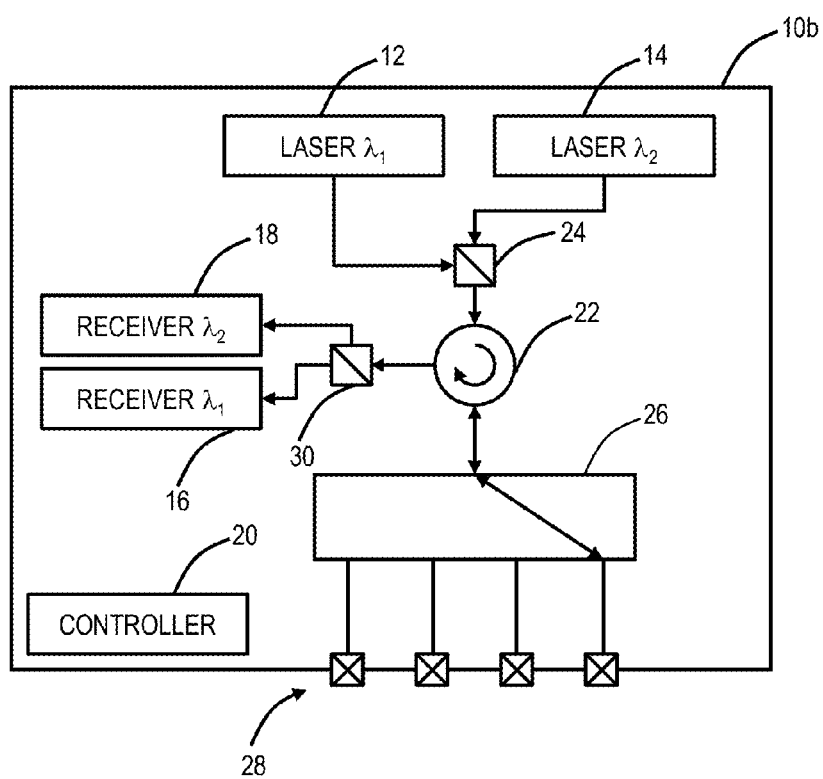
FIG. 2 is a block diagram of the OTDR measurement system with separate receiver for the dual wavelengths.
Figure 3:
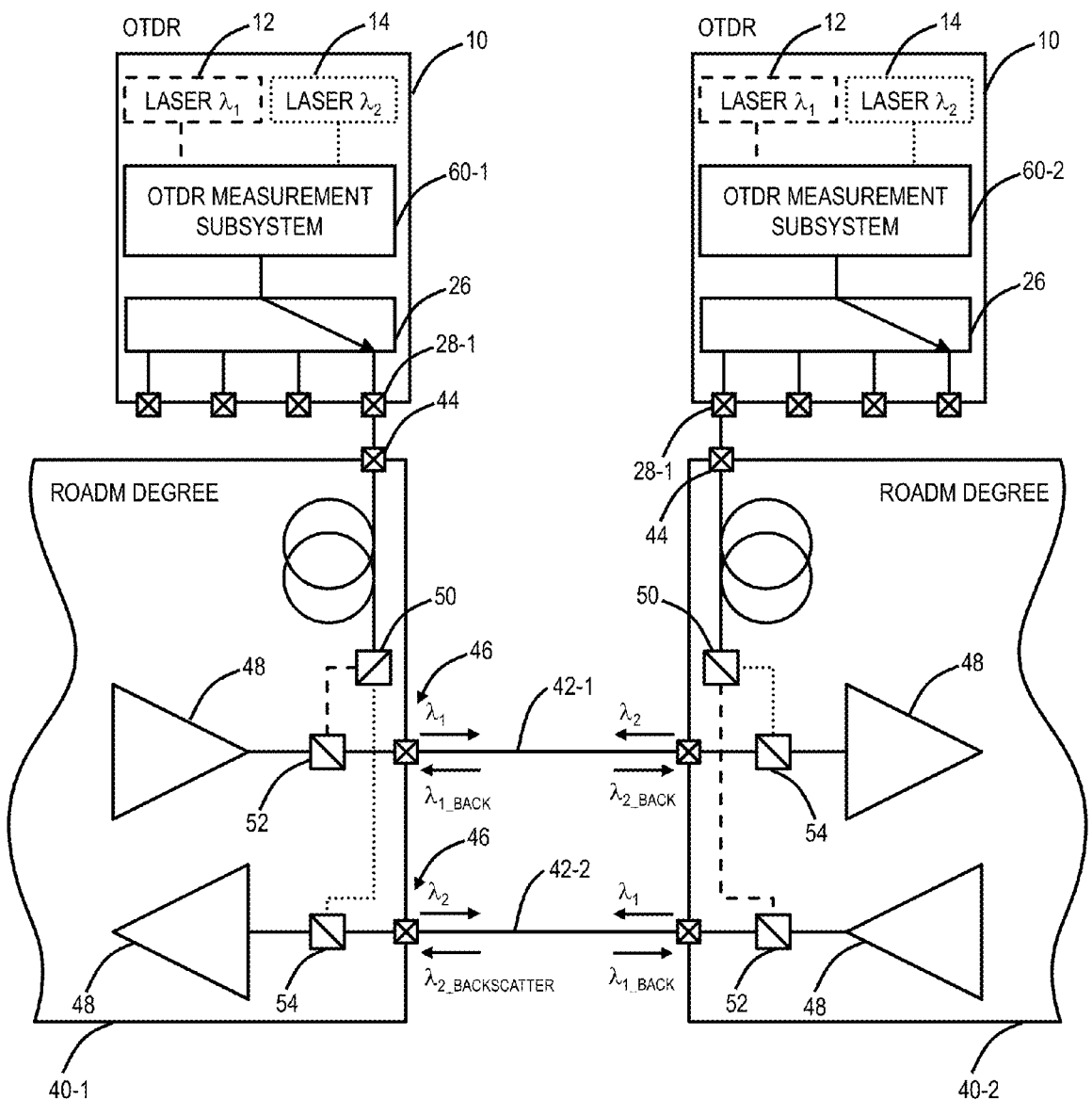
FIG. 3 is a block diagram of connectivity of OTDR measurement systems to Reconfigurable Optical Add/Drop Multiplexer (ROADM) degrees for a pair of fibers.

Referring to FIGS. 1 and 2, in an exemplary embodiment, block diagrams illustrate an OTDR measurement system 10 (denoted as OTDR measurement system 10a, 10b). FIG. 1 illustrates the OTDR measurement system 10a with a shared receiver implementation for the dual wavelengths and FIG. 2 illustrates the OTDR measurement system 10b with a separate receiver for the dual wavelengths. The OTDR measurement system 10a, 10b includes two lasers 12, 14 providing OTDR pulses at two different wavelengths $\lambda_1$, $\lambda_2$, i.e., $\lambda_1 \neq \lambda_2$. The OTDR measurement system 10a, 10b is adapted to integrate or plug into a component in a WDM system, such as an optical amplifier or the like. The OTDR measurement system 10a, 10b is operable to support dual wavelength OTDR measurements over two fibers. Specifically, two OTDR measurement systems 10a, 10b are configured opposing one another between the two fibers. Fiber connectivity for the OTDR measurement systems 10a, 10b is illustrated in FIG. 3.

The choice of the two wavelengths $\lambda_1$, $\lambda_2$ is an important part of the design. In an exemplary embodiment, wavelength $\lambda_1$ is a red wavelength, e.g., greater than 1560 nm, outside of the Erbium Doped Fiber Amplifier (EDFA) amplification band and greater than WDM signals which are typical between 1530 nm and 1565 nm (i.e., the EDFA amplification band). The wavelength $\lambda_2$ can be a blue wavelength, e.g., less than 1530 nm, similarly outside of the EDFA amplification band and less than WDM signals. In an exemplary embodiment, wavelength $\lambda_1$ co-propagates with the WDM signals while wavelength $\lambda_2$ counter-propagates with the WDM signals. The aforementioned selection of wavelengths $\lambda_1$, $\lambda_2$ advantageously supports in-service operation with WDM signals. That is, a key aspect of the OTDR measurement system 10a, 10b is that it utilizes two OTDR sources for the lasers 12, 14 at two different wavelengths (e.g., red and blue wavelengths) in order to interrogate two fibers connected to a node in the transmit and receive directions. In an exemplary embodiment, wavelength $\lambda_1$ is 1625 nm, and wavelength $\lambda_2$ is 1527 nm.

Again, the two wavelengths are selected to be outside of one or more signal bands with traffic-bearing channels (e.g., C-Band, approximately 1530 to 1565 nm, or other transmission bands such as the L-band, S-band, etc.), so that the bi-directional OTDR can operate in-service while traffic is running. That is, the two wavelengths are selected to be outside of spectrum reserved for traffic-bearing channels. For example, by selecting the wavelength $\lambda_1$ co-propagating with the WDM signals greater than a largest valued wavelength in the one or more signal bands (e.g., 1560 nm in the C-band), i.e., a longer wavelength, non-linear interactions such as cross-phase modulation are avoided or minimized relative to the WDM signals. For the counter-propagation, there is more flexibility as non-linear interactions with the WDM signals are minimized. By selecting the wavelength $\lambda_2$ counter-propagating with the WDM signals less than a smallest valued wavelength in the one or more signal bands (e.g., 1528 nm in the C-band), i.e., a shorter wavelength, the wavelength $\lambda_2$ can be used to measure and profile Raman gain. For example, an OTDR wavelength immediately below the WDM signal band can be used to monitor Raman gain. Having one wavelength in the Raman gain regime and one outside would help to perform in-service measurements of the Raman gain and its distribution through the fiber medium, without needing to rely solely on baseline traces taken without the Raman pumps on. Of course, other values for the different wavelengths $\lambda_1$, $\lambda$ are also contemplated. Also, the lasers 12, 14 can include tunable wavelengths, supporting different wavelengths for different applications.

The OTDR measurement system 10a includes a single receiver 16, which is shared by the two different wavelengths $\lambda_1$, $\lambda_2$. Specifically, the OTDR measurement system 10a operates each of the different wavelengths $\lambda_1$, $\lambda_2$ at different points in times so that the OTDR traces can be acquired separately. The OTDR measurement system 10b includes two receivers 16, 18 for each of the different wavelengths $\lambda_1$, $\lambda_2$ and the OTDR measurement system 10b supports the simultaneous acquisition of OTDR traces in both directions on the fiber. The OTDR measurement system 10a, 10b also includes a controller 20 which is communicatively coupled to the lasers 12, 14 and the receivers 16, 18 for control thereof.

The OTDR measurement system 10a, 10b include an optical circulator 22 or other three-port optical connectivity device. One advantage of the optical circulator 22 is that it enables a single fiber port to connect to the OTDR measurement system 10a, 10b, thereby eliminating cabling errors and reducing complexity. The lasers 12, 14 are multiplexed via a filter 24 which is adapted to combine the different wavelengths $\lambda_2$ into a composite signal. The filter 24 can be a WDM filter or coupled configured to combine red and blue wavelengths together. The composite signal is provided to a first port of the optical circulator 22. Optionally, a second port of the optical circulator 22 can connect to an optical switch 26.

The optical switch 26 allows the OTDR measurement system 10a, 10b to time-share between different fibers. That is, wherever the optical switch 26 is connected, the associated two fibers can be tested. In the example of FIGS. 1 and 2, the optical switch 26 is a 1×4 optical switch with one port permanently coupled to the optical circulator 22 and the other four ports 28 selectively coupled to associated fiber pairs. In this manner, the optical switch 26 allows the same OTDR measurement system 10a, 10b to connect and be shared by up to four degrees (or fiber pairs) at a Reconfigurable Optical Add/Drop Multiplexer (ROADM) node. The objective of the optical switch 26 and the time-sharing functionality is to reduce overall cost and equipment requires since an OTDR system does not require continuous operation. That is, an OTDR trace operation can be selected at a specific time or periodically obtained. It is not required to operate continuously.

The ports 28 transmit the composite signal from the lasers 12, 14 to a specific fiber pair, based on the configuration of the optical switch 26 and receive backscattered signals from the composite signal. The backscattered signal from the fiber span travels back into the second port of the optical circulator 22, exiting at a third port coupled to the receiver 16 (in the OTDR measurement system 10a) or the receivers 16, 18 (in the OTDR measurement system 10b). In FIG. 1, in the OTDR measurement system 10a, the backscattered signal terminates at the single receiver 16, which is shared by the two wavelengths $\lambda_1$, $\lambda_2$. In this case, the two OTDR sources must operate one at a time so that OTDR traces can be acquired separately. In FIG. 2, in the OTDR measurement system 10b, an optical filter 30 is used to send the two wavelengths $\lambda_1$, $\lambda_2$ to the different receivers 16, 18, which while costlier, enables both wavelengths $\lambda_1$, $\lambda_2$ to operate simultaneously. In both arrangements, the optical circulator 22 and the optical switch 26 are shared, which helps minimize cost and space.

The controller 20 can be adapted to control operation of the receiver 16 for determining which OTDR trace is being taken between the wavelengths $\lambda_1$, $\lambda_2$ as well as to control the operation of the optical switch 26 which determines which fiber pair is under test. Note, the controller 20 contemplates remote operation of the OTDR measurement system 10a, 10b as well as providing resulting OTDR trace data to external systems, such as Network Management Systems (NMSs), Element Management Systems (EMSs), Software Defined Networking (SDN) controllers or applications, planning systems, and the like.

Referring to FIG. 3, in an exemplary embodiment, a block diagram illustrates connectivity of OTDR measurement systems 10-1, 10-2 to ROADM degrees 40-1, 40-2 for a pair of fibers 42-1, 42-2. Here, the OTDR measurement system 10-1's port 28-1 is connected to a port 44 of the ROADM degree 40-1 and similarly, the OTDR measurement system 10-2's port 28-1 is connected to the port 44 of the ROADM degree 40-2. The ROADM degrees 40-1, 40-2 are connected to one another via the fibers 42-1, 42-2. Again, with the 1×4 optical switch 26, the OTDR measurement systems 10-1, 10-2 can connect to three additional ROADM degrees (not shown). Again, one advantage of the OTDR measurement systems 10-1, 10-2 is there is only a single fiber connection between the port 44 and the port 28-1.

The ROADM degree 40-1, 40-2 can be formed by a module which includes ports 46 connectable to the fibers 42-1, 42-2 and the port 44. The module can include other functionality such as optical amplifiers 48 (e.g., EDFAs, Raman pumps, etc.), Wavelength Selective Switches (WSSs), and the like. The module forming the ROADM degree 40-1, 40-2 includes various filters 50, 52, 54 to distribute the wavelengths $\lambda_1$, $\lambda_2$ from the OTDR measurement systems 10-1, 10-2. Within the ROADM degree 40-1, 40-2, the OTDR signal connection between the port 44 is coupled to an optical filter 50, which demultiplexes the two wavelengths $\lambda_1$, $\lambda_2$. A second filter 52 combines the wavelength $\lambda_1$ (e.g., red wavelength) with the WDM signals from the amplifier 48 going in the transmit direction, i.e., right to left on the fiber 42-1 and left to right on the fiber 42-2.

A third filter 54 similarly combines the wavelength $\lambda_2$ (e.g., blue wavelength) with the WDM signals coming into the ROADM degree 40-1, 402 in the receive direction (right to left on the fiber 42-2 and left to right on the fiber 42-1); in this case, the OTDR source and the WDM signals signal are counter-propagating. Both ends of the fibers 42-1, 42-2 have a similar arrangement, which means that within each fiber 42-1, 42-2, there is a red OTDR source (wavelength $\lambda_1$) co-propagating with the WDM signals and a blue OTDR source (wavelength $\lambda_2$) counter-propagating.

In this example, OTDR wavelength $\lambda_1$ is transmitted co-propagating with the WDM channels on the fiber 42-1 and a backscatter signal $\lambda_{1\_BACK}$ is received back at an OTDR measurement subsystem 60-1 (which includes the receiver 16 or the receivers 16, 18) in the OTDR measurement system 10-1. In the other direction on the fiber 42-1, the OTDR wavelength $\lambda_2$ is transmitted counter-propagating with the WDM channels and a backscatter signal $\lambda_{2\_BACK}$ is received back at an OTDR measurement subsystem 60-1. The fiber 42-2 has the opposite configuration as the fiber 42-1 with respect to the wavelengths $\lambda_1$, $\lambda_2$, $\lambda_{1\_BACK}$, $\lambda_{2\_BACK}$.

The use of two distinct wavelengths $\lambda_1$, $\lambda_2$ ensures that the two OTDR sources sharing the same fiber 42 do not interfere with each other and, therefore, can operate independently. This eliminates the need to synchronize the ODTR's at both ends of the span, which greatly simplifies the software implementation. It ensures that both OTDR's are available at any time since one OTDR being in use does not prevent the other from taking measurements. There is also the benefit of simplified cabling since only a single fiber is required to connect the OTDR measurement system 10 to a ROADM card or module for both directions.

Figure 4:
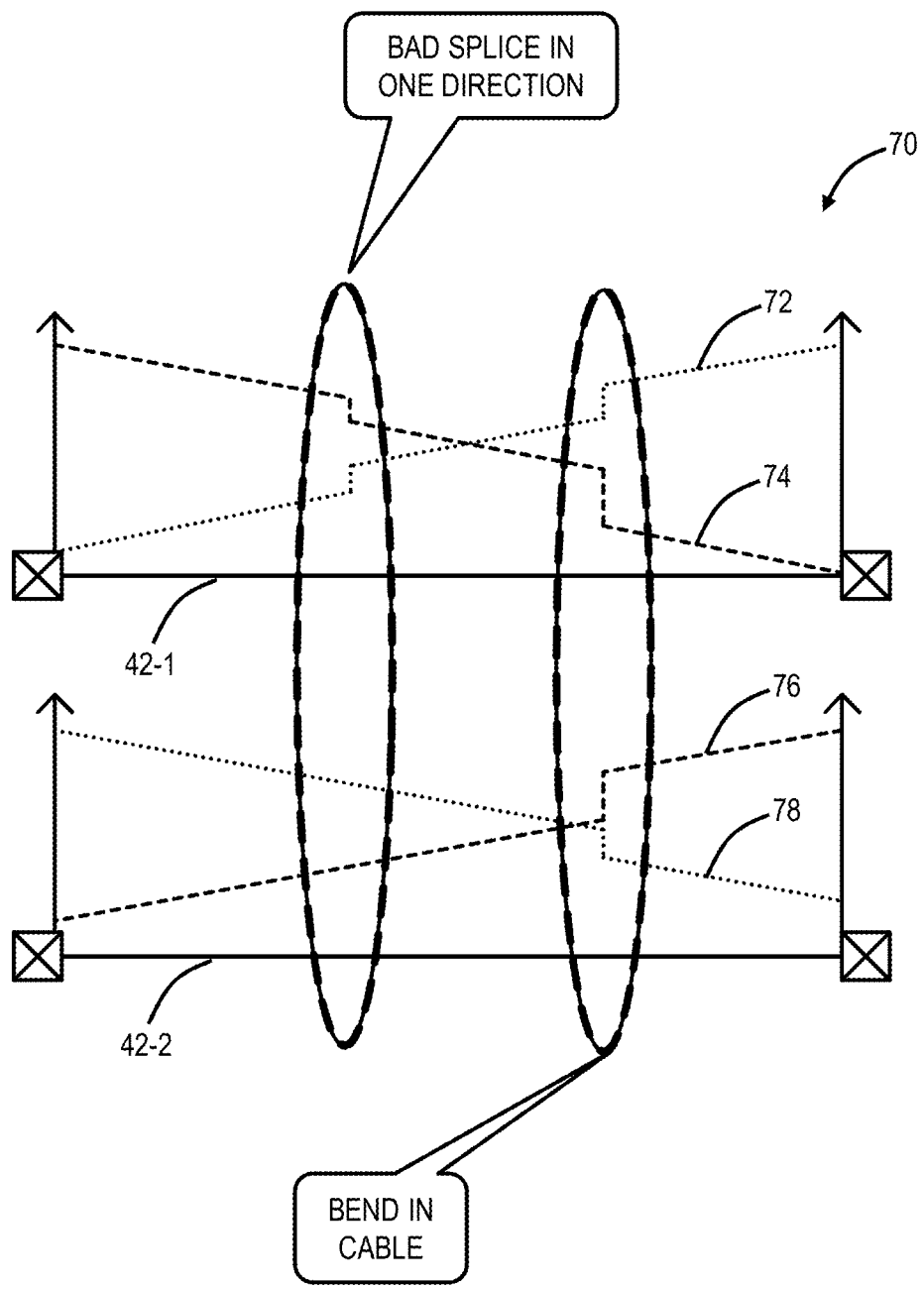
FIG. 4 is a graph of exemplary OTDR traces on the fibers connected between the ROADM degrees in FIG. 3.
Figure 5:
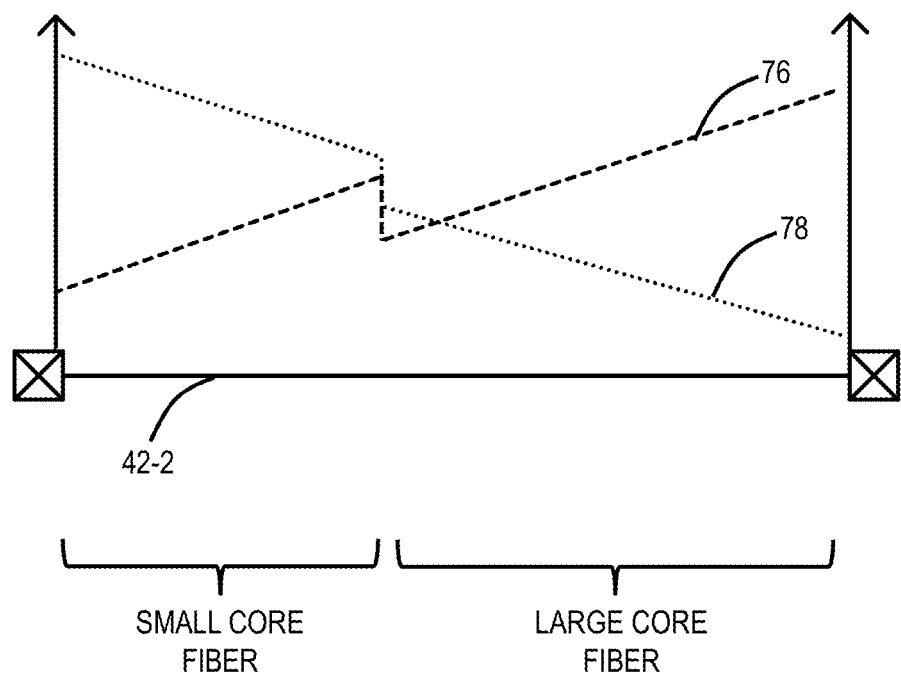
FIG. 5 is a graph of an OTDR trace on a fiber illustrating differentiation of different fiber types.

Referring to FIG. 4, in an exemplary embodiment, a graph illustrates exemplary OTDR traces 70 on the fibers 42-1, 42-2 from FIG. 3. Referring to FIG. 5, in an exemplary embodiment, a graph illustrates an OTDR trace 80 on a fiber 42 illustrating differentiation of different fiber types. Once dual-wavelength OTDR traces are acquired at each OTDR measurement system 10, such as through the associated controller 20, the trace data can be exchanged between the network elements via an Optical Service Channel (OSC), a Data Communications Network (DCN), or the like so that composite traces can be created by combining the traces collected from both ends of the same fiber 42. The traces from each span could also be collated by a higher level application such as an EMS, NMS, SDN application, etc.

Advantageously, the bi-directional OTDR data enables better differentiation and event detection than a single, uni-directional OTDR trace. In FIG. 4, the OTDR traces 70 are on the two fibers 42-1, 42-2, including traces 72, 74, 76, 78. The traces 72, 78 use the wavelength $\lambda_1$ and the traces 74, 76 use the wavelength $\lambda_2$. With the bi-directional OTDR data, a bad splice in one direction can be differentiated from a bend in the entire cable. Here, the bad splice only shows up on the fiber 42-1 whereas the bend in the entire cable shows up on both the fibers 42-1, 42-2. In the case of loss events, FIG. 4 shows how the use of two distinct wavelengths makes it possible to distinguish between bend loss, which has a very high wavelength dependence, and splice or connector loss, which does not. This feature could also be used for intrusion detection, i.e., detecting when a third party is attempting to extract an optical signal from a transmission fiber by bending the fiber to couple some of the light out. The dual-wavelength OTDR running in real time would be able to raise an alarm and pinpoint the location of the intrusion attempt as soon as it occurred.

In FIG. 5, the bi-directional OTDR data allows a user to distinguish between a change in fiber type and a lossy splice. In a uni-directional OTDR trace, both a change in fiber type and a lossy splice have a similar signature. In the case of a bi-directional OTDR, similar splice loss will be observed in both directions, whereas a change in fiber type will appear as a loss in one direction (going from smaller core to larger core fiber) but as a gain in the other (going from larger to smaller core).

The OTDR measurement system 10 can be used to perform bend loss measurements, since the further apart the two wavelengths $\lambda_1$, $\lambda_2$ are, the easier it is to measure bend loss. Alternatively, the two wavelengths $\lambda_1$, $\lambda_2$ could be selected to be close to each other, which would have the advantage of producing more consistent results in both directions, but without the ability to measure bend loss. The OTDR measurement system 10 can be used to solve the issue of single-working-fiber systems where there are traffic signals sharing a single fiber in two directions, allowing the OTDR to be used in both directions for in-service measurements. In an exemplary embodiment, the lasers 12, 14 as the OTDR sources could be used for an additional communications channel in addition to providing OTDR pulses, by including a data modulator to modulate data thereon.

Figure 6:
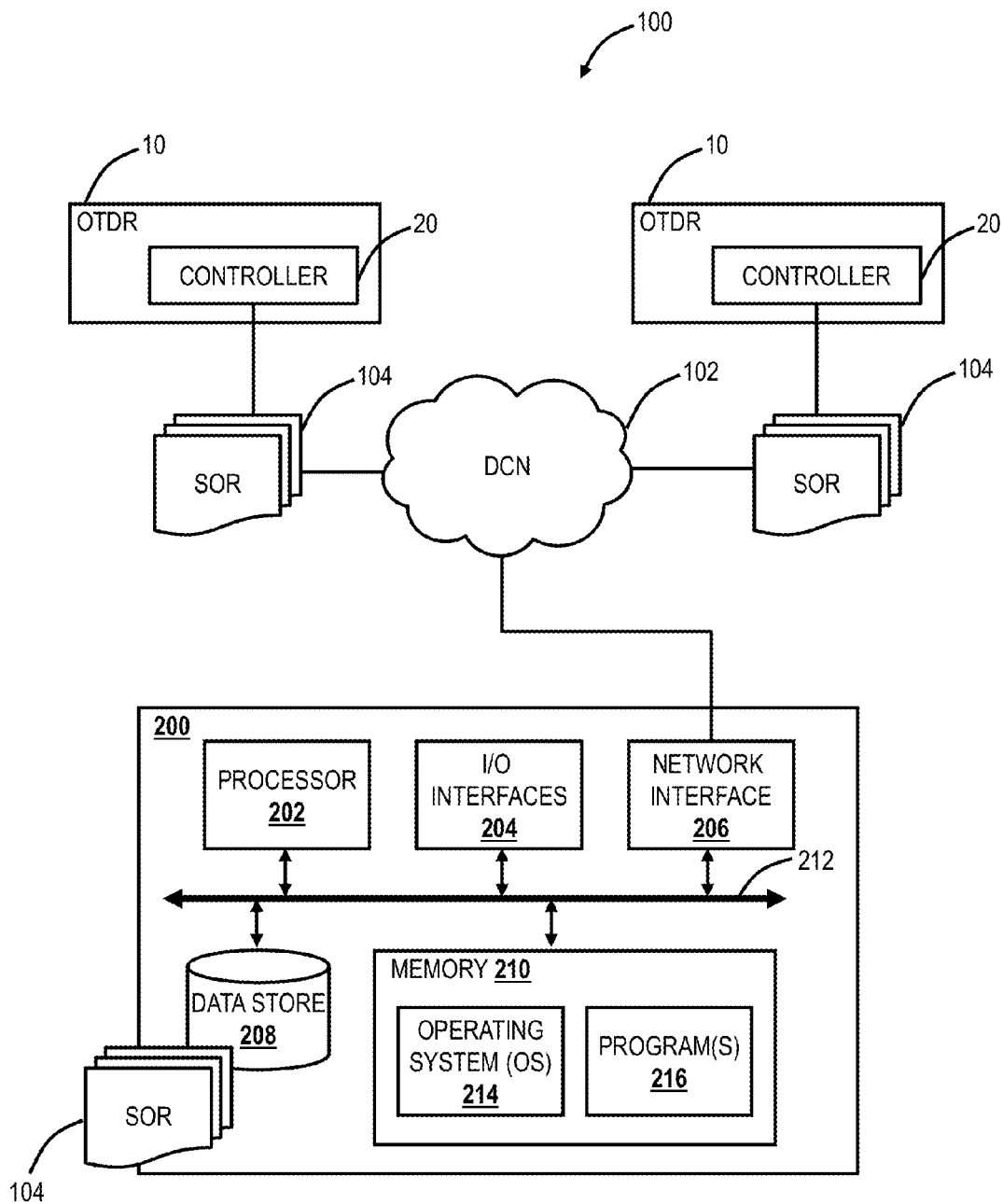
FIG. 6 is a network diagram of an OTDR system with a plurality of OTDR measurement systems communicatively coupled over a Data Communications Network (DCN) to a server.

Referring to FIG. 6, in an exemplary embodiment, a network diagram illustrates an OTDR system 100 where a plurality of OTDR measurement systems 10 are communicatively coupled over a Data Communications Network (DCN) 102 to a server 200. In an exemplary aspect, the OTDR measurement systems 10 are embedded in a WDM system, operating in-service along with data connectivity to the server 200 which can be an EMS, NMS, planning system, SDN controller, SDN application, or the like. In an exemplary embodiment, the OTDR traces 70, 80 in the OTDR measurement systems 10 can be Standard OTDR Records (SOR) formatted files 104 (e.g., compliant to Bellcore GR-196/SR-4731 Standard OTDR Records). Due to the embedded nature of the OTDR measurement system 10, it knows what fiber 42 each trace 70, 80 is associated with. The OTDR measurement system 10 can tag each SOR file 104 (or any other file format defining the traces 70, 80) and provide the SOR files 104 to the server 200.

The server 200 may be a digital computer or another type of processing system that, in terms of hardware architecture, generally includes one or more processors 202, input/output (I/O) interfaces 204, a network interface 206, a data store 208, and memory 210. It should be appreciated by those of ordinary skill in the art that FIG. 6 depicts the server 200 in an oversimplified manner, and a practical embodiment may include less or additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processors 202 are a hardware device for executing software instructions. The processors 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processors 202 are configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the DCN 102 which may include the Internet, a wide area network (WAN), a local area network (LAN), and the like, etc. The network interface 206 may include, for example, an Ethernet card or adapter or a wireless local area network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an exemplary embodiment, the server 200, as an EMS, NMS, planning system, SDN controller, SDN application, etc., communicates with various OTDR measurement systems 10 in a network. The server 200 is adapted to receive and store the SOR files 104, such as in the data store 208. The server 200 can be adapted to create an amalgamation of multiple traces, including from two different integrated OTDR devices. That is, traditionally, combinations of different OTDR traces are performed based on traces collected by the same device (e.g., driven from one site to the other. In the systems and methods described herein, there is a different OTDR measurement system 10 embedded in the WDM system at each end.

Conventionally, to combine OTDR traces, the process was manual where a user enters a length of fiber or cable or there are discernable features in common between two traces (e.g., like the drop at the end of the trace owing to the end of the fiber) which are not available for correlating two different fibers in a same cable. With the server 200, traces can be automatically combined at either end of a fiber span, without user input. Here, the OTDR measurement systems 10 can tag which fiber and which end a particular trace is associated with, providing such information to the server 200 with the SOR files 104.

Figure 7:
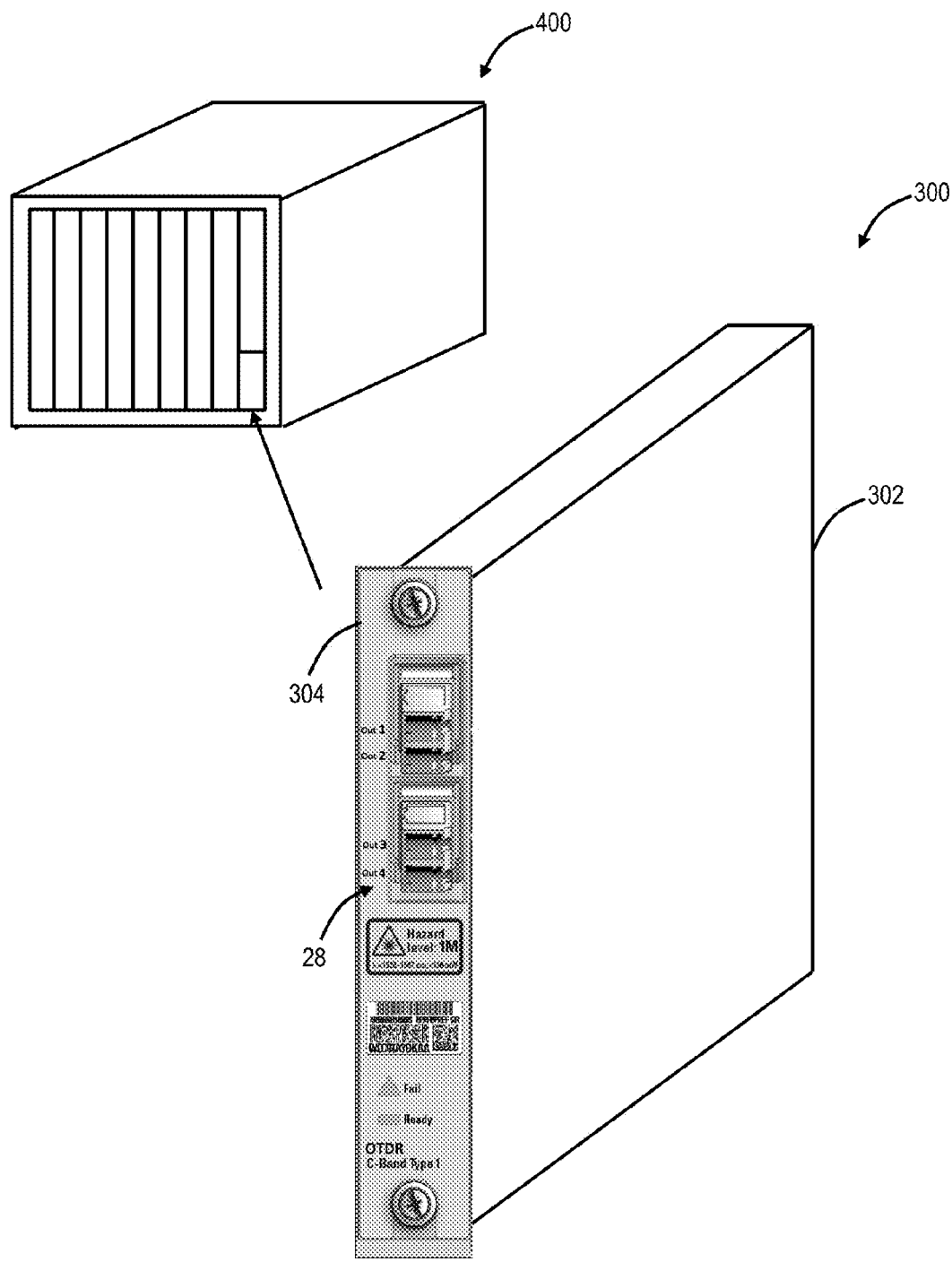
FIG. 7 is a perspective diagram illustrates a form factor of the OTDR measurement system.

Referring to FIG. 7, in an exemplary embodiment, a perspective diagram illustrates a form factor 300 of the OTDR measurement system 10. The form factor 300 includes a housing 302 with a faceplate 304. The housing 302 is adapted to plug into a module in a WDM system. The faceplate 304 includes the ports 28. In an exemplary embodiment, the ports 28 include LC connectors. Again, the OTDR measurement system 10 is shown supporting four degrees (or fiber pairs) and each port 28 is a single fiber connection for both fiber pairs of a degree. The pluggable housing 302 can include backplane connectors for data and power, specifically data connectivity for the controller 20 to connect to the DCN 102 to the server 200 as well as for receiving instructions.

The housing 302 can be plugged into a WDM network element 400. The WDM network element 400 can be a ROADM, terminal, etc. The WDM network element 400 can include the ROADM degrees 40, such as through modules, and a carrier card or the like capable of supporting the housing 302. Once inserted in the carrier card, the port 28 is connected to the port 44 on one of the ROADM degrees 40. The OTDR measurement system 10 is capable of remote operation through the NMS, EMS, etc. associated with the WDM network element 400. Through this control, a user can remotely cause an OTDR measurement on any one of N degrees (e.g., N is four as described above, although other values are contemplated based on the size of the optical switch 26).

In an exemplary embodiment, a dual wavelength Optical Time Domain Reflectometer (OTDR) system, is embedded in the network element 400. The dual wavelength OTDR system includes a first OTDR source for wavelength $\lambda_1$ (the laser 12); a second OTDR source for wavelength $\lambda_2$ (the laser 14); an OTDR measurement subsystem 60 adapted to measure backscatter signals $\lambda_{1\_BACK}$ and $\lambda_{2\_BACK}$ associated with the wavelength $\lambda_1$ and the wavelength $\lambda_2$, and one or more ports 28 connecting the first OTDR source, the second OTDR source, and the OTDR measurement subsystem 60 to one or more fiber pairs 42; wherein wavelength $\lambda_1$ and wavelength $\lambda_2$ are each outside of one or more signal bands with traffic-bearing channels, thereby enabling operation in-service with the traffic-bearing channels.

The OTDR measurement subsystem 60 can include an optical circulator 22 including a first port, a second port, and a third port; an optical filter 24 connected to the first port and adapted to multiplex the first OTDR source and the second OTDR source; the second port connected to the one or more ports 28; and a receiver system (the receiver 16 or the receivers 16, 18) connected to the third port. The one or more ports can include N ports, and the dual wavelength OTDR system can further include a 1:N optical switch 26 connected to the N ports 28, wherein the 1:N optical switch is adapted to selectively switch between the N ports to time share the dual wavelength OTDR system.

The one or more ports 28 connect to a port 44 on a module in the network element 400, with a single fiber connecting the dual wavelength OTDR to the port 44 on the module. The module can include a plurality of optical filters 50, 52,

56 adapted to demultiplex the wavelength $\lambda_1$ and the wavelength $\lambda_2$, to add the wavelength $\lambda_1$ to a first fiber 42-1 co-propagating with the associated optical signals, and to add the wavelength $\lambda_2$ to a second fiber 42-2 counter-propagating with the associated optical signals. The wavelength $\lambda_1$ can be greater than 1560 nm, and the wavelength $\lambda_2$ can be less than 1530 nm. The wavelength $\lambda_1$ can be greater than 1600 nm to avoid non-linear interactions with the associated optical signals and the wavelength $\lambda_2$ can be slightly less than 1530 nm to monitor Raman gain (e.g., 1527 nm).

The dual wavelength OTDR system can further include a controller 20 communicatively coupled to the OTDR measurement subsystem 60, wherein the controller 20 is adapted to provide OTDR trace data to an external system. The controller 20 is adapted to determine a bend loss measurement, determine Raman gain based on the wavelength $\lambda_1$ being in the Raman gain regime and the wavelength $\lambda_2$ being outside the Raman gain regime, and distinguish between bend loss and a splice or connector loss to detect intrusion on a fiber.

In another exemplary embodiment, a dual wavelength Optical Time Domain Reflectometer (OTDR) method includes the dual wavelength OTDR embedded in a network element. The dual wavelength OTDR method includes providing a first OTDR source for wavelength $\lambda_1$; providing a second OTDR source for wavelength $\lambda_2$; providing an OTDR measurement subsystem adapted to measure backscatter signals $\lambda_{1\_BACK}$ and $\lambda_{2\_BACK}$ associated with the wavelength $\lambda_1$ and the wavelength $\lambda_2$; and providing one or more ports connecting the first OTDR source, the second OTDR source, and the OTDR measurement subsystem to one or more fiber pairs; wherein wavelength $\lambda_1$ and wavelength $\lambda_2$ are each outside of one or more signal bands with traffic-bearing channels, thereby enabling operation in-service with the traffic-bearing channels.

In a further exemplary embodiment, the network element 400 is a Reconfigurable Optical Add/Drop Multiplexer (ROADM) including one or more degrees. The ROADM includes a dual wavelength Optical Time Domain Reflectometer (OTDR) system adapted to perform OTDR measurements on a fiber pair associated with a degree using a wavelength $\lambda_1$ and a wavelength $\lambda_2$; and one or more degrees, each degree including an OTDR port to connect to the dual wavelength OTDR and two ports connected to the fiber pair; wherein wavelength $\lambda_1$ and wavelength $\lambda_2$ are each outside of the C-band, thereby enabling the dual wavelength OTDR system to operate in-service co-propagating and counter-propagating with associated optical signals. The one or more degrees can include N degrees, and the ROADM can further include a 1:N optical switch connecting the dual wavelength OTDR system to the one or more degrees, wherein the 1:N optical switch is adapted to selectively switch between the N degrees to time share the dual wavelength OTDR system.

Figure 8:
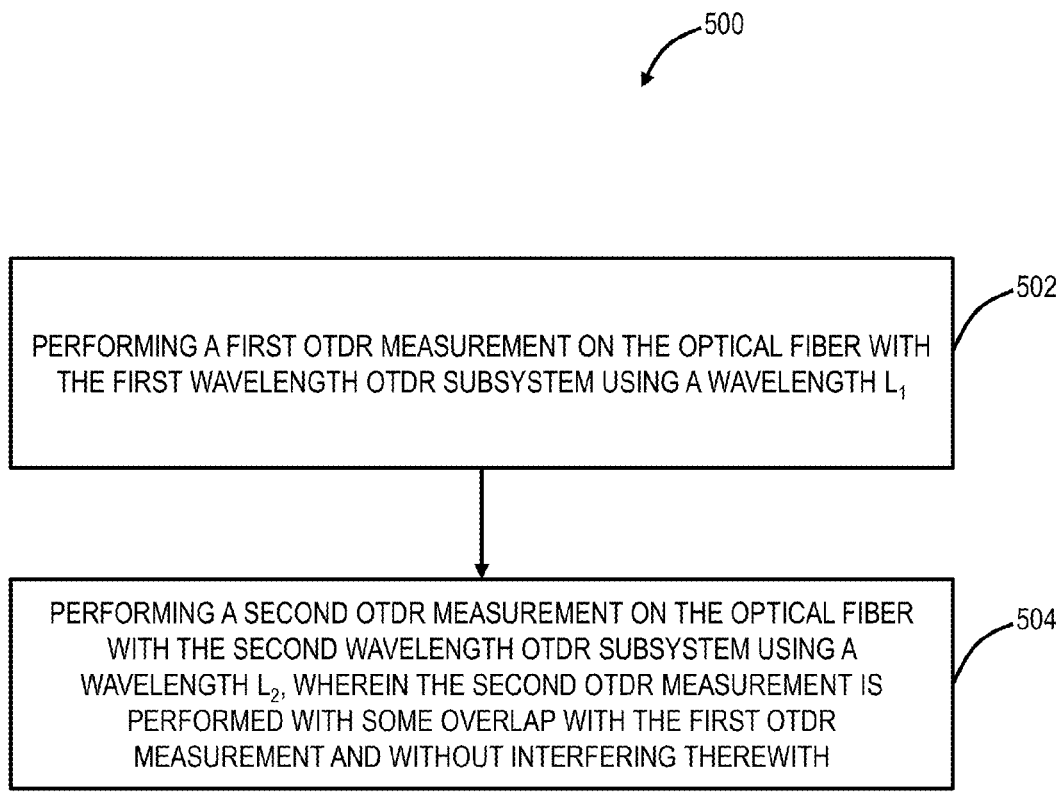
FIG. 8 is a flowchart of a dual wavelength Optical Time Domain Reflectometer (OTDR) process implemented on an optical fiber with a first wavelength OTDR subsystem communicatively coupled to one end of the optical fiber and a second wavelength OTDR subsystem communicatively coupled to another end of the optical fiber.

Referring to FIG. 8, in an exemplary embodiment, a flowchart illustrates a dual wavelength Optical Time Domain Reflectometer (OTDR) process 500 implemented on an optical fiber with a first wavelength OTDR subsystem communicatively coupled to one end of the optical fiber and a second wavelength OTDR subsystem communicatively coupled to another end of the optical fiber. The dual wavelength OTDR process 500 includes performing a first OTDR measurement on the optical fiber with the first wavelength OTDR subsystem using a wavelength $\lambda_1$ (step 502); and performing a second OTDR measurement on the optical fiber with the second wavelength OTDR subsystem using a wavelength $\lambda_2$, wherein the second OTDR measurement is performed with some overlap with the first OTDR measurement and without interfering therewith (step 504). The wavelength $\lambda_1$ and wavelength $\lambda_2$ are each outside of one or more signal bands with traffic-bearing channels, thereby enabling operation in-service with the traffic-bearing channels. Optionally, the wavelength $\lambda_1$ is greater than a largest valued wavelength in the one or more signal bands and the wavelength $\lambda_2$ is less than a smallest valued wavelength in the one or more signal bands.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A dual wavelength Optical Time Domain Reflectometer (OTDR) system, embedded in a network element, the dual wavelength OTDR system comprising:
    a first OTDR source for wavelength $\lambda_1$;
    a second OTDR source for wavelength $\lambda_2$;
    an OTDR measurement subsystem adapted to measure backscatter signals $\lambda_{1\_BACK}$ and $\lambda_{2\_BACK}$ associated with the wavelength $\lambda_1$ and the wavelength $\lambda_2$; and
    one or more ports connecting the first OTDR source, the second OTDR source, and the OTDR measurement subsystem to one or more fiber pairs;
    wherein wavelength $\lambda_1$ and wavelength $\lambda_2$ are each outside of one or more signal bands with traffic-bearing channels, thereby enabling operation in-service with the traffic-bearing channels,
    wherein the one or more ports connect to a port on a module in the network element, with a single fiber connecting the dual wavelength OTDR to the port on the module, and wherein the module comprises a plurality of optical filters adapted to demultiplex the wavelength $\lambda_1$ and the wavelength $\lambda_2$, to add the wavelength $\lambda_1$ to a first fiber co-propagating with the traffic-bearing channels, and to add the wavelength $\lambda_2$ to a second fiber counter-propagating with the traffic-bearing channels.

2. The dual wavelength OTDR system of claim 1, wherein the OTDR measurement subsystem comprises:
    an optical circulator comprising a first port, a second port, and a third port;
    an optical filter connected to the first port and adapted to multiplex the first OTDR source and the second OTDR source;
    the second port connected to the one or more ports; and
    a receiver system connected to the third port.

3. The dual wavelength OTDR system of claim 1, wherein the one or more ports comprise N ports and further comprising:
    a 1:N optical switch connected to the N ports, wherein the 1:N optical switch is adapted to selectively switch between the N ports to time share the dual wavelength OTDR system.

4. The dual wavelength OTDR system of claim 1, wherein the wavelength $\lambda_1$ is greater than a largest valued wavelength in the one or more signal bands and the wavelength $\lambda_2$ is less than a smallest valued wavelength in the one or more signal bands.

5. The dual wavelength OTDR system of claim 1, wherein the wavelength $\lambda_1$ is greater than a largest valued wavelength in the one or more signal bands to avoid non-linear interactions with the traffic-bearing channels and the wavelength $\lambda_2$ is within a Raman gain bandwidth to monitor Raman gain.

6. The dual wavelength OTDR system of claim 1, further comprising:
    a controller communicatively coupled to the OTDR measurement subsystem, wherein the controller is adapted to provide OTDR trace data to an external system.

7. The dual wavelength OTDR system of claim 6, wherein the controller is adapted to
    determine a bend loss measurement, and
    distinguish between bend loss and a splice or connector loss to detect intrusion on a fiber.

8. The dual wavelength OTDR system of claim 6, wherein the controller is adapted to
    determine Raman gain based on the wavelength $\lambda_1$ being in the Raman gain regime and the wavelength $\lambda_2$ being outside the Raman gain regime.

9. A dual wavelength Optical Time Domain Reflectometer (OTDR) method, wherein the dual wavelength OTDR is embedded in a network element, the dual wavelength OTDR method comprising:
    providing a first OTDR source for wavelength $\lambda_1$;
    providing a second OTDR source for wavelength $\lambda_2$;
    providing an OTDR measurement subsystem adapted to measure backscatter signals $\lambda_{1\_BACK}$ and $\lambda_{2\_BACK}$ associated with the wavelength $\lambda_1$ and the wavelength $\lambda_2$; and
    providing one or more ports connecting the first OTDR source, the second OTDR source, and the OTDR measurement subsystem to one or more fiber pairs;
    wherein wavelength $\lambda_1$ and wavelength $\lambda_2$ are each outside of one or more signal bands with traffic-bearing channels, thereby enabling operation in-service with the traffic-bearing channels,
    wherein the one or more ports connect to a port on a module in the network element, with a single fiber connecting the dual wavelength OTDR to the port on the module, and wherein the module comprises a plurality of optical filters adapted to demultiplex the wavelength $\lambda_1$ and the wavelength $\lambda_2$, to add the wavelength $\lambda_1$ to a first fiber co-propagating with the traffic-bearing channels, and to add the wavelength $\lambda_2$ to a second fiber counter-propagating with the traffic-bearing channels.

10. The dual wavelength OTDR method of claim 9, wherein the OTDR measurement subsystem comprises:
    an optical circulator comprising a first port, a second port, and a third port;
    an optical filter connected to the first port and adapted to multiplex the first OTDR source and the second OTDR source;
    the second port connected to the one or more ports; and
    a receiver system connected to the third port.

11. The dual wavelength OTDR method of claim 9, wherein the one or more ports comprise N ports and further comprising:
    providing a 1:N optical switch connected to the N ports, wherein the 1:N optical switch is adapted to selectively switch between the N ports to time share the dual wavelength OTDR system.

12. The dual wavelength OTDR method of claim 9, wherein the wavelength $\lambda_1$ is greater than a largest valued wavelength in the one or more signal bands and the wavelength $\lambda_2$ is less than a smallest valued wavelength in the one or more signal bands.

13. The dual wavelength OTDR method of claim 9, wherein the wavelength $\lambda_1$ is greater than a largest valued wavelength in the one or more signal bands to avoid non-linear interactions with the traffic-bearing channels and the wavelength $\lambda_2$ is within a Raman gain bandwidth to monitor Raman gain.

14. The dual wavelength OTDR method of claim 9, further comprising:
    providing a controller communicatively coupled to the OTDR measurement subsystem, wherein the controller is adapted to provide OTDR trace data to an external system,
    wherein the controller is adapted to
        determine a bend loss measurement, and
        distinguish between bend loss and a splice or connector loss to detect intrusion on a fiber.

15. The dual wavelength OTDR method of claim 8, further comprising:
providing a controller communicatively coupled to the OTDR measurement subsystem, wherein the controller is adapted to provide OTDR trace data to an external system,
wherein the controller is adapted to
determine Raman gain based on the wavelength $\lambda_1$ being in the Raman gain regime and the wavelength $\lambda_2$ being outside the Raman gain regime.

16. A dual wavelength Optical Time Domain Reflectometer (OTDR) method implemented on an optical fiber with a first wavelength OTDR subsystem communicatively coupled to one end of the optical fiber and a second wavelength OTDR subsystem communicatively coupled to another end of the optical fiber, the dual wavelength OTDR method comprising:
performing a first OTDR measurement on the optical fiber with the first wavelength OTDR subsystem using a wavelength $\lambda_1$; and
performing a second OTDR measurement on the optical fiber with the second wavelength OTDR subsystem using a wavelength $\lambda_2$,
wherein wavelength $\lambda_1$ and wavelength $\lambda_2$ are each outside of one or more signal bands with traffic-bearing channels, thereby enabling operation in-service with the traffic-bearing channels,
wherein each of the first wavelength OTDR subsystem and the second wavelength OTDR subsystem connect to an associated port on an associated module, with a single fiber connecting the each of the first wavelength OTDR subsystem and the second wavelength OTDR subsystem to the associated port on the associated module, and wherein the associated module comprises a plurality of optical filters adapted to demultiplex the wavelength $\lambda_1$ and the wavelength $\lambda_2$, to add the wavelength $\lambda_1$ to a first fiber co-propagating with the traffic-bearing channels, and to add the wavelength $\lambda_2$ to a second fiber counter-propagating with the traffic-bearing channels.

17. The dual wavelength OTDR method of claim 16, wherein the wavelength $\lambda_1$ is greater than a largest valued wavelength in the one or more signal bands and the wavelength $\lambda_2$ is less than a smallest valued wavelength in the one or more signal bands.

* * * * *